United States Patent [19]

Lamas

[11] Patent Number: 5,196,036
[45] Date of Patent: Mar. 23, 1993

[54] DE-THORNING APPARATUS FOR REMOVING THORNS FORM THE NOPAL CACTUS PETALS AND THE LIKE

[75] Inventor: Leonardo R. Lamas, Tucson, Ariz.
[73] Assignee: Victor Flores, Tucson, Ariz.
[21] Appl. No.: 706,163
[22] Filed: May 28, 1991
[51] Int. Cl.$^5$ .............................................. A01G 3/02
[52] U.S. Cl. ...................................................... 47/1.01
[58] Field of Search ......................................... 47/1.01
[56] References Cited

U.S. PATENT DOCUMENTS

| | | | |
|---|---|---|---|
| 1,855,104 | 4/1932 | Edgin | 47/1.01 |
| 2,167,337 | 7/1939 | DeMeester | 47/1.01 |
| 2,646,621 | 7/1953 | Catanese | 47/1.01 |
| 2,806,325 | 9/1957 | Fox | 47/1.01 |
| 5,062,210 | 11/1991 | Arroyo, Jr. | 47/1.01 |

FOREIGN PATENT DOCUMENTS 198967  8/1907  Fed. Rep. of Germany ....... 47/1.01

Primary Examiner—David A. Scherbel
Assistant Examiner—Joanne C. Downs

[57] ABSTRACT

A de-thorning instrument that can be manipulated to gouge thorny processes on cactus petals, such as those found on the nopal cactus, for preparation as a food staple. The de-thorning instrument can be provided as a pre-shaped cutting instrument or shapable cutting instrument that gouges only the swelled base of the thorny process on the cactus petal in a single sweep of the de-thorning instrument. The de-thorning instrument is an edged instrument having an edged body structure including at least one concave edged portion and an adjacent expanded body portion that effects simultaneous cutting and removal of the cactus thorns. A handle member is attached to the edged body structure for ease of manipulating the apparatus. The edged body structure is preferably a flat, substantially thin, flexible, edged body structure that facilitates being manually formed into a concave edged portion, including an expanded body portion adjacent the concave edge that facilitates the simultaneous removal of the cut thorn process. The concave edged portion and expanded body portion can be alternatively provided as a preformed, ready-to-use de-thorning instrument, such as a spoon-like de-thorning instrument, a sickle-shaped de-thorning instrument, or a closed-loop, open body de-thorning instrument.

4 Claims, 2 Drawing Sheets

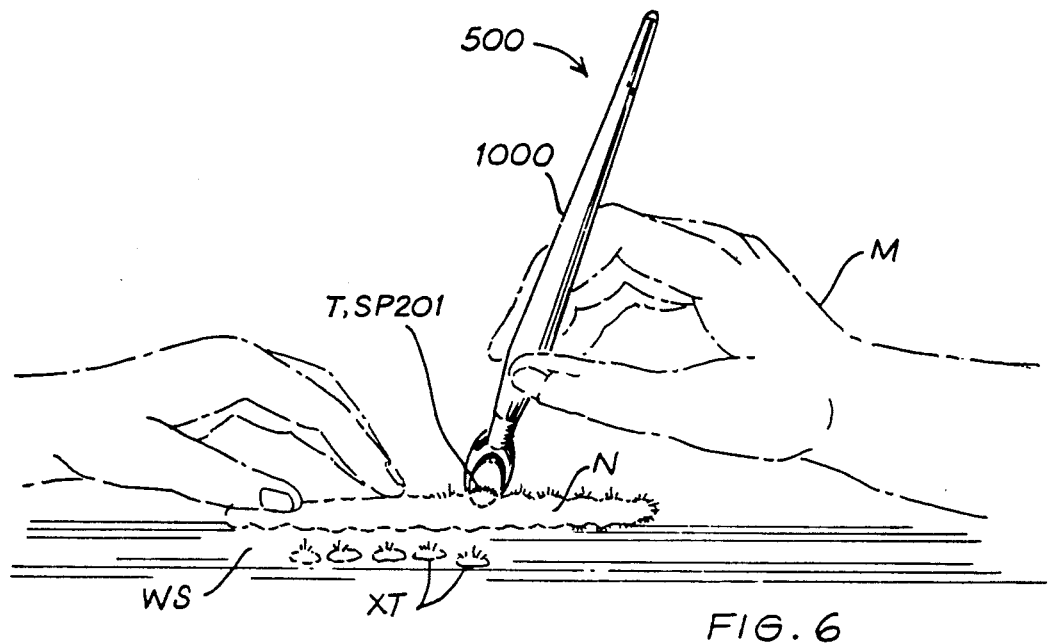
FIG. 6
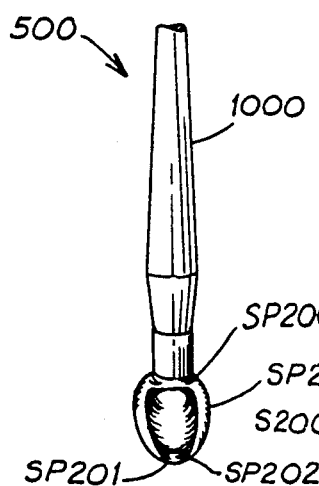
FIG. 4
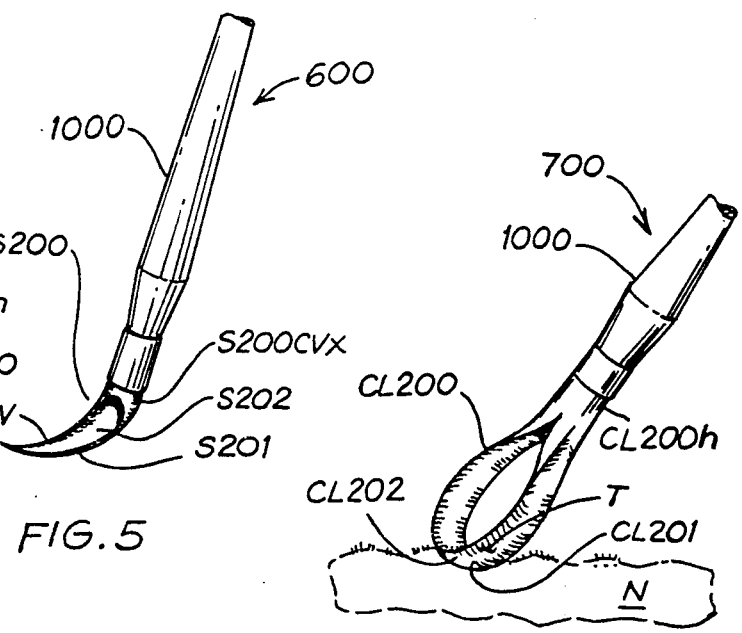
FIG. 5
FIG. 7

DE-THORNING APPARATUS FOR REMOVING THORNS FORM THE NOPAL CACTUS PETALS AND THE LIKE

FIELD OF THE INVENTION

This invention relates to edged instruments. More particularly the present invention relates to edged instruments shaped to cut and simultaneously remove the part being cut. Even more particularly, the present invention relates to edged instruments having adjustment means for shaping the cutting edge and associated body structure to cut and simultaneously remove the part being cut, in particular, a thorny process member of a nopal cactus petal.

DESCRIPTION OF THE PRIOR ART

The nopal cactus petal, especially the new petal growth, referred to as the "nopalito" in Spanish, meaning the tender little nopal cactus petal, is a food staple in the southwestern part of the United States, and perhaps in other parts of the world. The preparation stage to make the cactus petal edible requires that the thorny processes be removed from the surface to allow safe preparation and consumption of the juicy, meaty part of the tender nopal petal. The cutting tools known to applicant are simple ends of a knife that do not effectively gouge the thorny process without damaging a large portion of petal surrounding the thorny process. The plurality of thorny processes throughout the petal body requires careful handling and unique scraping action to produce an adequate yield of the nopal product. Typically, the nopal has a teardrop shape and measures on the order of 6 to 7 inches in length, 3 to 4 inches in width and ⅛ to ¾ inches in thickness. Other peeler instruments, such as the potato peeler, have been tried but are not deemed adequate for the task at hand. The flat, thin cactus petal with the thorny processes can not be manipulated using the tip of a potato peeler, firstly because there is not enough thickness to the petal and secondly because the thorny petal can not be manipulated like a potato.

Therefore, a need is seen to exist for a de-thorning instrument that can be manipulated to gouge thorny processes on cactus petals during preparation as a food staple.

More particularly, a need is seen to exist for a handled de-thorning instrument that is shaped or shapable to gouge only the swelled base of the thorny process on a cactus petal, i.e. to cut and remove the thorny process in a single sweep of the de-thorning instrument.

SUMMARY OF THE INVENTION

Accordingly, the primary object of the present invention is to provide a de-thorning instrument that can be manipulated to gouge thorny processes on cactus petals during preparation as a food staple.

Another object of the present invention is to provide a handled, de-thorning instrument that is shaped or shapable to gouge only the swelled base of the thorny process on a cactus petal, i.e. to cut and remove the thorny process in a single sweep of the de-thorning instrument.

The foregoing objects are accomplished by providing an edged instrument having an edged body structure including at least one concave edged portion and an expanded body portion that effects simultaneous cutting and removing, by lifting away, the thorny process of a nopal cactus thorn process. A handle member is attached to the edged body structure for ease of manipulating the apparatus. The edged body structure is preferably a flat, substantially thin, flexible, edged body structure that facilitates being manually formed into a concave edged portion, including an expanded body portion adjacent the concave edge that facilitates the simultaneous removal of the cut thorn process. The concave edged portion and expanded body portion can alternatively be provided as a pre-formed, ready-to-use de-thorning apparatus, such as a spoon-like de-thorning instrument, a sickle-shaped de-thorning instrument, or an closed-loop, open body de-thorning instrument. In a preferred embodiment, the handle member comprises an elongated U-shaped structure including opposed flexible, cylindrical arm members, each arm member is provided with an attachment means at a distal end for attaching respective ends of a flexible edged body structure, resembling a double-edged razor blade. The flexible edged body structure being detachably secured to the arm's attachment means for flexibly coacting with the opposed flexible arms for forming a concave edged portion and an expanded body portion. To hold the desired concave form achievable by flexing the handle arms, a latching means is provided with selectable tension adjustment points to facilitate maintaining the opposed flexible arms and the edged body structure in a tensioned state.

The method includes using the de-thorning apparatus of the present invention to de-thorn a cactus petal for preparation as a food staple.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

BRIEF DESCRIPTION OF THE DRAWINGS

FIG. 4 is a perspective view of a spoon-like, preformed de-thorning instrument in accordance with the present invention that facilitates gouging thorn processes on a cactus petal.

FIG. 5 is a perspective view of a sickle-shaped preformed de-thorning instrument in accordance with the present invention that facilitates gouging thorn processes on a cactus petal.

FIG. 6 is an applications view of the present invention illustrating the pre-formed, spoon-like, de-thorning instrument embodiment in accordance with the present invention being used to gouge thorn processes on a cactus petal.

FIG. 7 is an perspective applications view of a closed-loop, open body, pre-formed de-thorning instrument illustrating a cactus thorn being gouged.

DESCRIPTION OF THE PREFERRED EMBODIMENT

Figure 1:
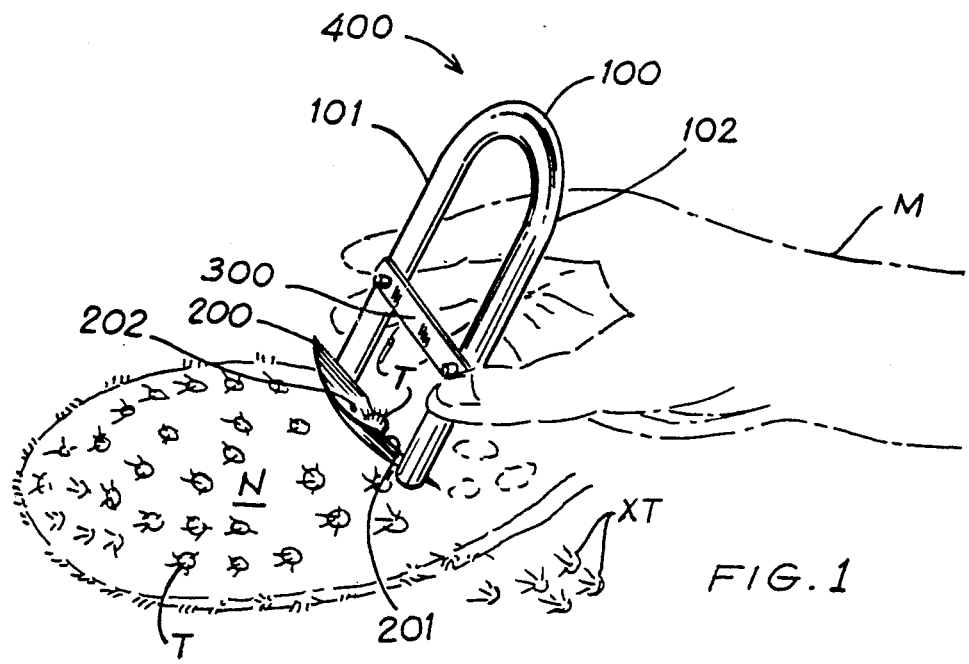
FIG. 1 is an applications view of the present invention illustrating the de-thorning instrument of the present invention in a selected tension setting that facilitates gouging thorn processes on a cactus petal.

FIG. 1 shows the de-thorning apparatus 400 being manually manipulated by M to cut and remove the multitude of thorny processes T on a cactus petal N. The removed thorns XT are gouged out to include the swollen base portion of the thorn T. The de-thorning apparatus 400 includes a handle member 100 shaped in an elongated U-shaped structure, which is made, by example, from a thin plastic rod material. The handle includes arms 101 and 102 across which is disposed a latching means 300 that facilitates holding a compressed state of arms 101, 102 upon coacting to shape an edged body structure 200. The shape required to gouge the nopal cactus thorns is a variable cutting-scoop shape that can cut various thorn sizes at the swollen base. To obtain the variable cutting-scoop shape, edged body structure 200 is sufficiently flexible to form a concave edge portion 201 and an adjacent expanded body portion 202 on structure 200. In the preferred embodiment, structure 200 is a flat, thin, rectangular, double-edged body structure, much like a razor blade. The combination of concave portion 201 and body portion 202 form a cutting-scoop that cuts along the outline of a cactus thorn, including the swollen base portion.

Figure 2:
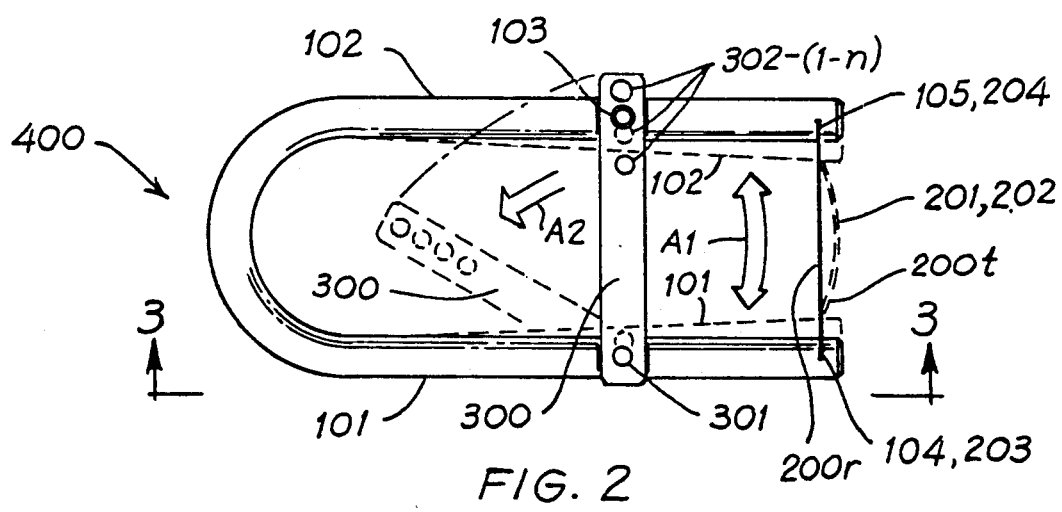
FIG. 2 is plan view of the preferred embodiment of the present invention illustrating the flexible arm members of the handle that flexibly coact with a flexible edged body structure to form the concave edge portion and further illustrating the latching mechanism for maintaining the formed concave shape.
Figure 3:
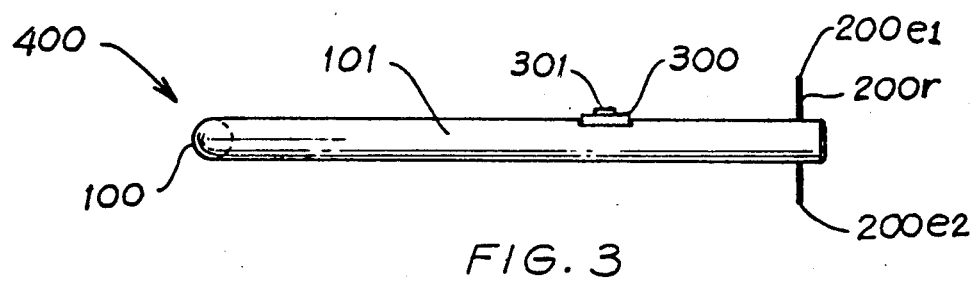
FIG. 3 is a side view taken along line 3—3 in FIG. 2 illustrating primarily the flexible edged body structure having a double edge.

As best seen in FIG. 2, de-thorning apparatus 400 includes an edged body structure 200 shown in a relaxed state and enumerated as 200r. The body structure 200 has ends 203, 204 that detachably engage in mounting slots 104, 105. De-thorning apparatus 400 also includes latching means 300 traversely disposed on arms 101, 102 for setting a desired tensioned state on edged body structure 200. Latching means 300 includes a pivot point 301, and a plurality of adjustments 302-(1-n) engagable on pin 103 for selecting a flexed tensioned setting of arms 101, 102 coacting with edged body structure 200 as indicated by arrow A1 to form concave edge portion 201 and adjacent expanded body portion 202 on tensioned edged body structure 200t. Latch means 300 pivots as shown by arrow A2 when not latched on pin 103. FIG. 3 shows apparatus 400 with edged body structure 200 having double edges 200e1 and 200e2.

FIGS. 4, 5 and 7 show pre-formed de-thorning apparatus 500, 600 and 700 whose respective edged body structure SP200, S200 and CL200 have a concave edged portion SP201, S201 and CL201 and a corresponding adjacent expanded body portion SP202, S202 and CL202 which in their respective pre-formed structure facilitate a gouging step to rid the cactus petal of thorny processes. FIG. 4 shows de-thorning apparatus 500 having edged body structure SP200 having a spoon-like body with a concave edged portion SP201 and expanded body portion SP202 disposed opposite a handle attachment portion SP200h where handle member 1000 is attached. FIG. 6 shows de-thorning apparatus 500 in use by M on a workstation WS where a cactus petal N, by example a "nopalito", is being de-thorned of thorn processes T, XT. As with the variable scoop apparatus 100, concave edged SP201 gouges the thorn T at the base. The tool end of the pre-formed apparatus 500, 600 and 700 may be replaceable or interchangeable, i.e. use the same handle 1000, to account for dulled edges or for different base shapes of the cactus thorn.

FIG. 5 shows de-thorning apparatus 600 having a sickle-shape edged body structure S200 comprising a concave cutting edge portion S201 on convex cutting edge S200CVX. The concave cutting edge S201 extends via expanded body portion S202 towards non-cutting concave edge S200CV. Apparatus 600 may be utilized where a cactus petal has a broad based thorn process.

FIG. 7 shows a closed-loop, open body, de-thorning apparatus 700 having a closed-loop edged body structure CL200 provided with at least one concave edged portion CL201 and an expanded body portion CL202 disposed opposite a handle attachment portion CL202h. The open body feature of de-thorning apparatus 700 avoids collecting gouged thorn processes XT on the tool end such as when using the spoon-like apparatus 500.

Therefore, while the present invention has been shown and described herein in what is believed to be the most practical and preferred embodiments, it is recognized that departures can be made therefrom within the scope of the invention, which is therefore not to be limited to the details disclosed therein but is to be accorded the full scope of the claims so as to embrace any and all equivalent apparatus.

I claim:

1. An edged apparatus for de-thorning a nopal cactus petal in preparation for use as a food staple, said apparatus comprising:
    a flexible edged body structure having at least one concave edged portion and an expanded body portion that, in combination, facilitate cutting and simultaneous removal of a nopal cactus thorn;
    a handle member attached to said edged body structure for manipulating said edged body structure,
    said edged body structure comprising flexible material that facilitates forming said at least one concave edged portion and said expanded body portion,
    said handle member comprising a U-shaped structure having opposed flexible arms, each of said arms having attachment means at a distal end for attaching to respective ends of said flexible edged body structure,
    said flexible edged body structure being detachably attached to said attachment means for coacting with said opposed flexible arms for forming said at least one concave edged portion and said expanded body portion; and
    latching means for adjustably maintaining said opposed flexible arms and said edged body structure in a tensioned state, said latching means comprising a cross member mounted to a pivot pin on one of said flexible arms, said cross member having a plurality of adjustments engagable on a pin member disposed on another one of said flexible arms opposite said pivot pin for selecting a desired flexed tensioned setting of said flexible arms and a desired concave form on said edged body structure.

2. An edged apparatus for de-thorning a nopal cactus petal as recited in claim 1, wherein:
    said flexible edge body structure comprises a double edge flexible body structure sharing a common expanded body portion.

3. An edged apparatus for de-thorning a nopal cactus petal in preparation for use as a food staple, said apparatus comprising:

an edged body structure having at least one concave edged portion and an expanded body portion that, in combination, facilitate cutting and simultaneous removal of a nopal cactus thorn;

a handle member attached to said edged body structure for manipulating said edged body structure, said handle member comprising an elongated U-shaped structure having opposed flexible arms; and latching means for adjustably maintaining said opposed flexible arms and said edged body structure in a tensioned state, said latching means comprising a cross member mounted to a pivot pin on one of said flexible arms, said cross member having a plurality of adjustments engagable on a pin member disposed on another one of said flexible arms opposite said pivot pin for selecting a desired flexed tensioned setting of said flexible arms and a desired concave form on said edged body structure.

4. An edged apparatus for de-thorning a nopal cactus petal as recited in claim 3, wherein:

said edged body structure comprises flexible material that facilitates forming said at least one concave edged portion and said expanded body portion;

said opposed flexible arms having attachment means at a distal end for attaching to respective ends of said flexible edged body structure;

said flexible edged body structure being detachably attached to said attachment means for coacting with said opposed flexible arms for forming said at least one concave edged portion and said expanded body portion.

* * * * *